United States Patent [19]

Lott

[11] 4,002,708
[45] Jan. 11, 1977

[54] METHOD FOR PRODUCING POLYMER IMPREGNATED FOAMED MASONARY ELEMENTS

[75] Inventor: James L. Lott, Champaign, Ill.

[73] Assignee: The United States of America as represented by the Secretary of the Army, Washington, D.C.

[22] Filed: Oct. 28, 1971

[21] Appl. No.: 193,495

[52] U.S. Cl. .............................. 264/42; 264/45.1; 264/133; 264/333
[51] Int. Cl.² .......................................... B29H 7/20
[58] Field of Search ..... 264/42, 129, 133, DIG. 44, 264/313, 333, 45.1; 117/123 C, 123 D, 65.2

[56] References Cited

UNITED STATES PATENTS

| | | | |
|---|---|---|---|
| 2,751,775 | 6/1956 | Sergovic | 264/271 |
| 2,979,801 | 4/1961 | Gasmire | 264/42 |
| 3,145,502 | 8/1964 | Rubenstein | 117/123 D |
| 3,567,496 | 3/1971 | Steinberg et al. | 52/309 |
| 3,650,804 | 3/1972 | Parisi | 117/65.2 |

OTHER PUBLICATIONS

The Chemistry of Cement and Concrete by Lea & Desch, 1956, pp. 339–340, published by Edward Arnold Ltd.
Encyclopedia of Science & Technology by McGraw–Hill Inc. (Publishers), 1966, vol. 6, pp. 526–529.

Primary Examiner—Donald J. Arnold
Assistant Examiner—John Parrish
Attorney, Agent, or Firm—William G. Gapcynski; Lawrence A. Neureither

[57] ABSTRACT

A two-phase material of foamed cement or concrete and polymer providing thermal insulating, structural elements composed of an unimpregnated foam cement or concrete core and impregnated surface regions of the two-phase material and method employing a hydraulic head or vacuum means to provide high polymer loading through a large volume of foam voids in the cement or concrete for easy impregnation of high viscosity monomers and uncured resins to a considerable depth below the surface of the cement or concrete before in situ polymerization.

3 Claims, 3 Drawing Figures

U.S. Patent          Jan. 11, 1977          4,002,708
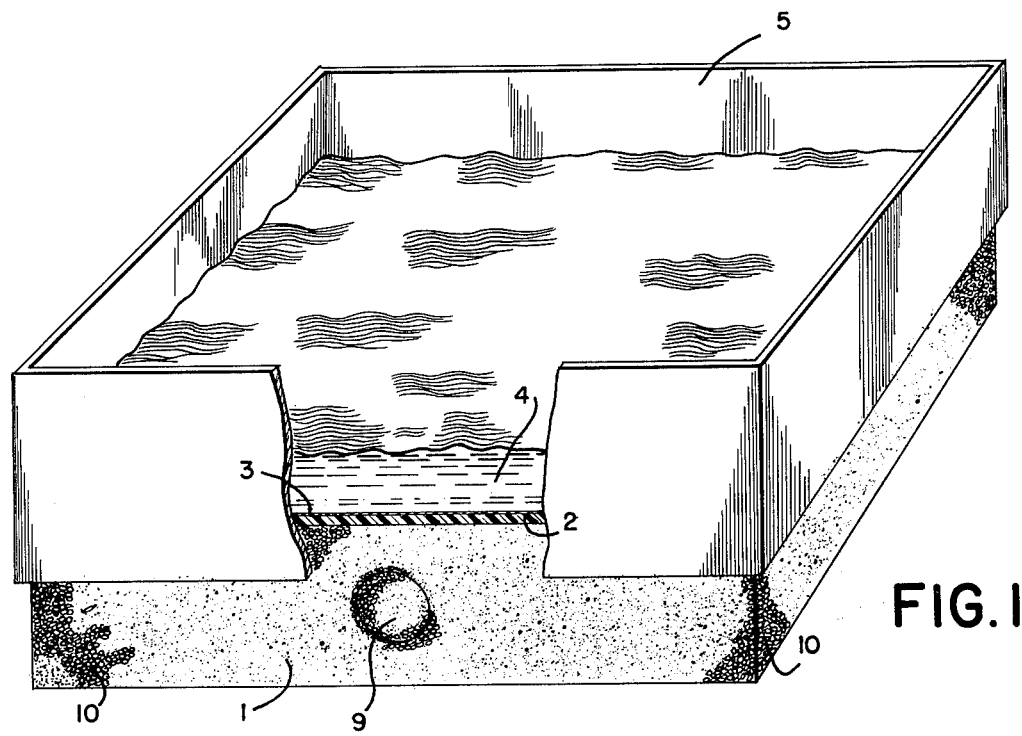
FIG.1
FIG.2
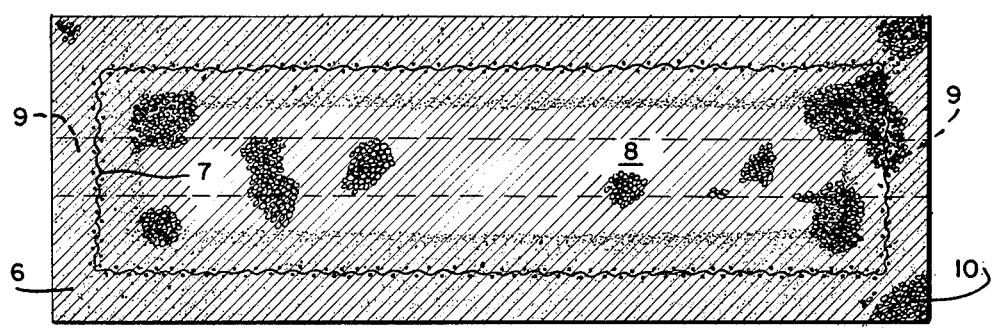
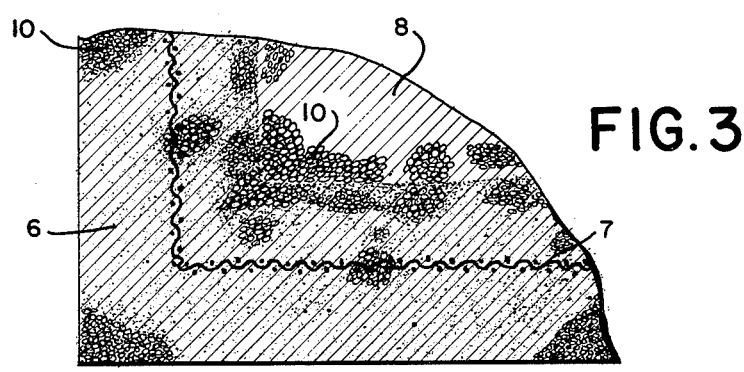
FIG.3

METHOD FOR PRODUCING POLYMER IMPREGNATED FOAMED MASONARY ELEMENTS

The invention described herein may be manufactured and used by or for the Government for governmental purposes without the payment to me of any royalty thereon.

BACKGROUND OF THE INVENTION

1. Field of the Invention

The invention relates to a method of impregnation of foam cements, mortars and concretes with liquid monomers and resins, subsequent in situ polymerization of the liquid monomers or resins and thermal insulating structural elements, produced by the method, comprised of composite building components having an unimpregnated core and impregnated surface regions. The production method utilizes the flow under a hydraulic gradient or vacuum means of a liquid through an interconnected gaseous phase due to foam voids dispersed within the cement paste matrix. The gaseous phase is dispersed within the cement paste before the paste hardens, and is not water filled. Subsequent polymerization of the liquid in the dispersed void system results in a two-phase material with a large volume of polymer and having optimum thermal insulating and structural properties. The liquid flow is independent of the gel pores and capillary pores of the cement paste, which may therefore be water filled. The resistance of the interconnected gaseous phase to flow of a liquid is low relative to the resistance of the gel and capillary pores. Thus more viscous liquids may be used with this impregnation method than with normal concrete impregnation techniques. The use of viscous monomers reduces the dilution by capillary adsorption during partial impregnating processes.

The method has been used with foam neat cement pastes, foam mortars, and foam concrete and promoted polyester-styrene resin with peroxide catalyst. Uniformly sized spherical voids become interconnected at a foam void fraction of 0.524, which correspond to a cubic packing of the spheres. The permeability of foam cements with foam void fractions above 0.6 is such that highly viscous monomers or resins can penetrate the foam cement. The dispersed voids are large enough to prevent capillary adsorption of the viscous liquid, and a driving pressure or vacuum is required for monomer or resin impregnation of the foam cement.

The relatively high permeability of lightweight foam concrete results in simple preparation techniques for liquid monomer and resin impregnation. Filling the foam voids with a polymer results in significant increases in strength and elastic modulus. Polymer loadings are high because of the large volume of voids in the lightweight foam concrete.

Partly polymer impregnated foam concrete structural elements are a practical application because material with high polymer loading can be restricted to surfaces, which have high stresses and act as an interface with environment. The foam concrete core acts as an insulator and as a spacer for the polymer impregnated surface regions. Thus the partly impregnated foam concrete element or "sandwich" panel can satisfy the multiple functional requirements of load and of environment. A pilot study of the herein described concept of partly impregnated foam concrete structural elements was conducted at the U.S. Army Construction Engineering Research Laboratory as a part of the In House Independent Research Program. The study was in general limited to combinations of foam neat cements and a promoted polyester resin with MEK peroxide for a catalyst. This limitation was based on the premise that optimum combinations of foam cements and polymers may be determined once the feasibility of the concept has been verified and the important parameters have been identified. The results of the study were presented at a Conference on Radiation and Isotope Techniques in Civil Engineering, in Brussels on Oct. 28–30, 1970 and were published in a report No. 37 of the Commissioner of the European Communities, Bureau Eurisotop entitled Polymerized Lightweight Structural Elements by J. Lott and D. Birkhimer.

2. Description of the Prior Art

A joint research effort of the Brookhaven National Laboratory and the United States Bureau of Reclamation over the past five years has shown that impregnation of hardened portland cement concretes of normal weight by a monomer, which is subsequently polymerized in situ, results in a concrete with improved engineering properties, which include increased strength, modulus of elasticity, durability, and a decreased permeability. A portion of the voids in hardened cement is filled with the liquid monomer. The subsequent in situ polymerization of the monomer introduces a solid polymer phase into regions of the concrete that formerly had no strength.

The void system of hardened concrete is complex and usually consists of gel pores and capillary pores in the cement paste, entrained air, entrapped air, microcracks, and the pores in the aggregates. The gel pores are characteristic of the hydration product of portland cement and are estimated to be of the order of 10 to 20 Angstroms in width. The size, total volume, and the distribution of the capillary pores are dependent on the original water-cement ratio and the degree of hydration that has occured. The capillary pores which vary in size, are estimated to be of the order of $5 \times 10^{-5}$ inches and form a random void system, which is often interconnected. The other voids present in concretes are usually larger in size than the capillary pores.

Monomer impregnation is probably limited to a small portion of the gel pores, to the capillary pores, and to the larger voids. Impregnation is retarded by the presence of evaporable water in the voids. Maximum monomer loading of normal weight concretes, which Brookhaven National Laboratory and United States Bureau of Reclamation have found essential for optimum engineering properties, requires the removal of evaporable water by thermal or vacuum drying and evacuation of the concrete to remove air from the voids before monomer soaking. Pressure is often used to reduce impregnation times. Reseachers at the American Cement Corporation, Technical Center, Riverside, Calif. have increased the volume of capillary pores present in cement paste by using high water-cement ratios to accomplish impregnation by capillary adsorption. This technique requires the removal of evaporable water, and specimens were dried under vacuum at 85° C for 24 hours before impregnation.

The techniques for obtaining maximum polymer loadings are complex. Methods for vacuum drying, thermal drying, and evacuation of concrete limit the practical applications of the resulting two-phase material. Only monomers with viscosities that are approximately equal to the viscosity of water have been used successfully to impregnate concretes with a normal weight cement paste matrix. Partial impregnation is difficult with these techniques since capillary adsorption removes the liquid monomer from the impregnated region and results in less than maximum polymer loadings in the regions of desired impregnation.

U.S. Pat. No. 3,567,496 concerns a method for impregnating preformed unfoamed concrete with a monomer and a peroxide polymerization catalyst and heating the concrete body until the monomer has polymerized in situ. Decreased permeability and increased compressive strength are claimed for the product. The concrete must be dry before impregnation and the monomer and catalyst may be impregnated in the same operation. Impregnation can be accomplished by immersing the concrete body and pressure can be used to increase the rate of impregnation. The degree of penetration can be varied by preevacuation, pressurization soaking, gas phase saturation, etc.

The improvement of using foam masonry compositions as in the instant invention results in a higher polymer loading because of large volume of interconnected foam voids, a very low pressure, polymerization of a higher viscosity monomer at room temperature and partial impregnation since capillary adsorption, which removes less viscous liquid monomers from the impregnated region, is prevented. Tests on samples of foam masonry polymer impregnated as in the instant invention showed compressive strength increase of 15 times and tensile strength increase of 32 times that of a non-foam polymer impregnated cement.

U.S. Pat. No. 2,751,775 teaches coating and impregnating a surface of a masonry block with a coating comprising polyester resin, styrene monomer and a peroxide catalyst by placing a masonry block in a mold containing the above coating composition and allowing the weight of the block to cause the composition to penetrate the pores of the masonry block. It is obvious that monomers of high viscosity would not impregnate a masonry block by this method and that impregnation of a considerable depth would not be possible nor would a high polymer loading of the masonry material be possible.

Foamed concrete and foamed portland cement are known for example as in the Third Topical Report on Concrete-Polymer Materials dated January 1971 by the Bureau of Reclamation, Denver, Col., Reference REC-ERC-71-6 and BNL 50275 (T-602). This reference employs foamed-glass aggregate concrete impregnated with methyl methacrylate and mearcrete, a foamed portland cement containing no aggregate phase, which latter preformed foam is used in the instant invention. However, using the less viscous methyl methacrylate, 20–30 times water, does not permit control of impregnation of the concrete by the polymerized liquid that the method of the instant invention does. The improvement of filling the foam voids with a considerably more viscous impregnating liquid to a considerable depth below the surface of a cast form yields a greater flexural stress capability and high thermal insulating properties. The improvement described herein employs mearlcrete, not a portland cement with aggregate but as a foam material to create voids in cement which voids are filled with a polymerizable liquid of a viscosity as high as 700 times that of water. The product obtained by the method herein disclosed yields an optimum condition in a material i.e. high insulating value and high structural strength.

SUMMARY OF THE INVENTION

The invention provides an improvement over these prior techniques. An improved structural, thermal insulating member is obtained by a method providing foamed masonry materials, impregnating them with liquid monomers or resins by vacuum means, in cooperation with or independent of a hydraulic head, to a pond of the liquid monomer or resin and a polymerization catalyst maintained in contact with a surface of a foamed masonry slab or block by a dike arranged around the perimeter of the slab or block and by subsequent in situ polymerization producing a two-phase material of foamed masonry material and polymer. The method produces a foamed masonry article composed of an unimpregnated foam concrete core and impregnated surface regions of the two-phase material having a high polymer loading through a large volume of foam voids. The method does not require vacuum or thermal drying to remove evaporable water to obtain useful polymer loadings. Viscous liquids with viscosities as high as 700 times the viscosity of water may be used for partly impregnated concrete, and there is little capillary adsorption to dilute impregnated regions.

Accordingly, it is an object of this invention to provide a method for producing polymer impregnated foamed masonry material having a high polymer loading in regions of high flexural stresses.

It is a further object of this invention to provide a method for producing masonry material capable of impregnation with liquid monomers or resins having viscosities as high as 700 times that of water and which is not diluted by capillary adsorption during partial impregnation processes.

It is a further object of this invention to provide a method for producing a two-phase masonry material having polymer impregnation in foam voids in surface regions and an unimpregnated foam core utilizing hydraulic head and vacuum means independent and in combination for impregnation.

It is a further object of this invention to provide a method for producing a masonry material wth high polymer loading adjacent surface regions and an unimpregnated foam cement core, the material having high thermal insulating value commensurate with high structural properties.

It is a further object of this invention to provide a method for producing a two-phase masonry material and polymer that does not require vacuum or thermal drying to remove evaporable water to obtain useful polymer loadings.

It is a further object of this invention to provide a two-phase lightweight masonry structural element having a large volume of foam voids and an unimpregnated foam masonry core and polymer impregnated surface regions for simultaneously including thermal insulating capability and high structural strength in the structural element.

It is a further object of this invention to provide a method for producing a two-phase material of masonry and polymer that utilizes an interconnected gaseous phase formed by a large volume of foam voids dispersed within the masonry material before in situ polymerization of an impregnated monomer or resin.

These and other objects and advantages, and novel features of the invention will become apparent from the following detailed description of the invention when considered in conjunction with the accompanying drawings wherein:

BRIEF DESCRIPTION OF THE DRAWINGS

FIG. 1 is a perspective view illustrating the method of the invention;

FIG. 2 is a vertical sectional view through a reinforced structural member produced by the method of the invention; and FIG. 3 is an enlarged view of a portion of FIG. 2.

DESCRIPTION OF THE PREFERRED EMBODIMENT

FIG. 1 illustrates the method of the invention. A cast foam cement slab 1 is shown although other shapes such as cubes, beams, etc., may be used. A dike 5 of suitable material is constructed and secured in liquid tight relation around the sides of the slab in a manner to permit the entire upper surface of the slab to project within the dike 5. The impregnating material 2 comprises a polyester resin, styrene solvent and peroxide catalyst in liquid form and is ponded within the dike on the surface of the slab 1. The specific materials which may be used are well known to those skilled in the art and are as described in the U.S. Patents above mentioned. A sheet 3 of polyethylene is placed on top of the liquid impregnating material and water 4 is ponded on top of the polyethylene sheet. The hydraulic head 4 or vacuum means 9 forces the impregnating liquid into the foam masonry material and the remaining impregnating liquid, polyethylene sheet and water removed. The impregnating liquid cures within the interconnected dispersed voids of the slab 1 and a two-phase material results within the top portion of the slab. The slab is inverted and the ponding process is repeated to form a second region of two-phase material. The impregnation of the liquid 2 may be accomplished alternatively by the hydraulic head 4 alone, by vacuum means, not shown, which is connected to opening 9 formed in the slab 1 as hereinafter described or by a combination of vacuum means and hydraulic head. Use of the vacuum means alone would cause impregnation by atmospheric pressure directly on the impregnating liquid and permit dispensing with the water impervious sheet 3.

FIG. 2 shows the resulting polymer impregnated foam masonry material, having light weight and capable of high flexural stresses, obtained by the process described above. The surface regions 6 comprise a foam masonry material impregnated with a polymer wherein the polymer loading is high because of the large volume of voids in the lightweight foam masonry material and the central core 8 comprises unimpregnated foam masonry material. If desired, a reinforcing material such as welded wire fabric 7 may be located in the impregnated surface regions 6. A slab of the two-phase material with such reinforcing will not crack under flexural loadings until the steel reinforcement approaches yielding.

FIG. 3 is an enlarged view of a portion of FIG. 2 and shows the results obtained by the herein described method, i.e. high volume of foam spherical voids 10 which are adjacent in the masonry material and are impregnated through this interconnected gaseous phase with high viscosity polymer. This structure provides the novel combination of a lightweight thermal insulating material with high flexural stress capability. As previously described the polymer impregnated foam masonry material having two opposed impregnated surfaces and a foam masonry core between provides good thermal insulating material.

Foam cements were obtained by blending a preformed foam lather into fresh Type III, high early strength cement paste with a 0.56 water-cement ratio in a drum mixer for 15 minutes. The mix proportions were as follows:

| | |
|---|---|
| Type III cement | 94 pounds |
| Sand | 100 pounds |
| Water | 9 gallons |
| Foam, Preformed | 5.07 cubic feet |
| Yield | 7.35 cubic feet |

To produce the foam mearlcrete, foamed Portland cement, is diluted with water and the resulting mix is placed in a pressurized air tank and upon application of air pressure a foam is formed. The foam is mixed into the cement in slurry form or paste. As an alternative finely ground aluminim powder may be used as the foam producing material but is not as desirable as the mearlcrete since the latter permits better control when mixing the foam with the slurry or paste cement. The foam will maintain its condition for about one-half hour and will retain its condition after being mixed in the cement slurry or paste but it is expected that it breaks up after the cement sets.

Impregnation of the polymer is accomplished with the cement in a moist cured condition. All specimens were cast without compactive effort and were moist cured for at least three days under a polyethylene sheet to reduce evaporation of mix water. Additional curing varied from continued moist curing to air drying. To facilitate the use of vacuum means for impregnating the monomeric liquid, a bore 9 is formed in the slab 1 during the casting operation of the slab by placing a rubber tube within the slurry or paste and prior to setting of the masonry material the tube is removed leaving the opening 9, one end of which may be connected to a vacuum means and the other end sealed during the vacuum process. An ancillary advantage to this operation is that the final impregnated slab is provided with a bore which may be used for passing objects such as pipes through the slab.

Two inch cubes and 3 by 6 in. cylinders were used to determine the properties of foam cements and polymer impregnated foam cements. Resin impregnation techniques were developed using 3 by 12 by 22 in. foam cement slabs. A 6 by 6 by 64 in. beam was cast for use in the evaluation of the behavior of a partly impregnated foam cement structural element.

All specimens that were polymerized were impregnated with a promoted 60 percent polyester-40 percent styrene resin, which had a viscosity of approximately 700 cps at room temperature. The method has been successfully used with resins of 40 percent polyester − 60 percent styrene, 50 percent polyester − 50 percent styrene, and 60 percent polyester − 40 percent styrene. Resin cure was accomplished at room temperature using 0.5 percent methyl ethyl ketone peroxide as catalyst, and the gel time was about 90 minutes.

Impregnation of the 12 by 22 in. slab surfaces was accomplished by ponding the resin and catalyst within a dike around the top surface. A latent film of cement paste, which tended to form on finished surfaces and closed the dispersed foam voids to resin impregnation, had to be removed by rubbing with a mason's stone prior to resin ponding. A hydraulic head of approximately five inches was required to drive the viscous resin into the foam cements. Ponding of excess resin on the surface to provide this head was wasteful since several inches of resin remained on the surface and gelled rather than penetrating into the foam cement. Impregnation was successfully accomplished by ponding resin and catalyst on the surface to a depth of ¾ inch within the dike. The resin was covered with a thin sheet of polyethylene, and then the sheet was ponded with five inches of water to provide the hydraulic head to drive the resin into the foam cement. A similar procedure was used to impregnate the 6 by 6 by 64 in. beam in two steps of polymerizing one surface and then inverting the beam to polymerize the opposite surface. Cube and cylinder specimens were impregnated by soaking the specimens in a rsin and catalyst bath with a five inch head of resin. Specimens were removed from the bath before the resin started to gel. All impregnated specimens were cured in the laboratory environment until tested.

The following Table shows the improved structural properties which can be realized by impregnation of foam masonry materials as in the instant invention:

into the 39pcf foam cement because the highly viscous resin only flowed through the dispersed foam voids, which do not normally fill with water. The presence of moisture in the paste did affect the resin cure, and erratic strengths resulted unless the specimens were air dried for 24 hours.

Strength data, which are the average of three tests, and elastic moduli of foam cements and of resin impregnated foam cements are given in the above Table. All strength specimens were air dried to a constant weight, and then half of the specimens were impregnated with resin and half were used as control specimens.

The 39pcf foam cement had a resin loading of 42pcf, and the compressive strength of the two inch cubes increased from 202psi for the control to 3,250psi for the impregnated foam cement, increasing the compressive strength 15 times. The resin loading and compressive strength increases for the 46pcf and 56pcf foam cements were relatively low because the resistance of these foam cements to resin flow prevented maximum resin loading.

The indirect tensile strength of a 39 pcf foam mortar was obtained from the split cylinder test using 3 by 6 in.

| | Properties of Foam Cements and Resin Impregnated Foam Cements | | | | | |
|---|---|---|---|---|---|---|
| Wet Density pcf | Dry Density pcf | Foam Void Fraction | Resin Loading pcf | Compressive Strength psi | Tensile Strength psi | Elastic Modulus psi |
| 39 | 32 | 0.65 | No | 202 | 30* | 100,000 |
| Impregnated | 74 | — | 42 | 3,250 | 1,008* | 425,000 |
| 46 | 41 | 0.60 | No | 355 | — | — |
| Impregnated | 69 | — | 28 | 1,430 | — | — |
| 56 | 49 | 0.50 | No | 657 | — | — |
| Impregnated | 54 | — | 4 | 795 | — | — |

*39pcf wet density foam mortar specimens were used for indirect tensile strength tests.

The foam cements obtained by mechanically blending a preformed foam into fresh cement paste had a dispersed foam void system of spheres that ranged in size from $3 \times 10^{-3}$ to $3 \times 10^{-2}$ in. Permeability of the foam cements as indicated by the resin loadings of the above Table increased with an increase in the foam void fraction or a decrease in density. The 39pcf (pounds per cubic foot) wet density foam cement gained a weight of resin in excess of its original weight. The 39pcf foam cement with this high permeability was used in the development of impregnation techniques.

The viscous resin under a five inch hydraulic head penetrated into the 39 pcf foam cement about 0.4 in. in 15 minutes and one inch in one hour. Partial impregnations to depths of one inch and greater were repeatedly obtained in the 39pcf foam cements before the resin gelled. Penetration depths expressed in inches of approximately 0.3 times the weight of resin in pounds per square foot of slab surface were obtained. This corresponds approximately to a 90 percent resin loading of the foam voids.

Resin penetration was uniform away from the edges of the slabs where the penetration was reduced. These edge effects were significant in the 6 by 6 by 64 in. beam and influenced the beam strength.

Drying of the foam cements before impregnation was originally considered necessary because the presence of free water resisted monomer impregnation of normal weight concretes. However, it was found that moisture in the cement paste did not retard resin penetration cylinders. The tensile strength of the foam mortar was 30psi, and the tensile strength of the resin impregnated foam mortar was 1008psi. Filling the dispersed foam voids with resin resulted in a tensile strength increase of 32 times. The fracture surface of the split cylinders contained a large number of fractures through the cured polyester resin. This indicates that sufficient bond developed between the resin and the cement paste for the resin to be effective in tension.

A stress-strain curve was obtained for the 39pcf foam cement using electrical resistance strain gauges on 3 by 6 in. cyclinders. The modulus of elasticity of the 39pcf foam cement was 100,000psi. A stress-strain curve for resin impregnated 39pcf foam cement was obtained using a 0.7 by 10.0 in. prism that was cut from the resin impregnated surface region of a 3 by 12 by 22 in. slab. The impregnated foam cement had an elastic modulus of 425,000psi.

The 6 by 6 by 64 in. beam had the tension and compression surfaces impregnated to depths of 0.44 and 0.38 in. respectively. The beam was first subjected to a concentrated load at the centerline of a 60 in. span. The beam failed at a load of 330 pounds and a midspan deflection of 0.07 in. The failure occurred at a cross-section that contained a flaw that was the result of the edge effects associated with impregnation. The longer remaining part of the beam was tested a second time on a span of 33 in. Failure occurred at a centerline load of 880 pounds.

the modular ratio of the impregnated foam cement to the foam cement was 4.25, and calculated shear deformation in the foam cement core or web were negligibly small relative to flexural deformations. The transformed section analysis of reinforced concrete straight-line theory was used to evaluate the flexural stress and midspan deflection. Transformation of the 6 by 6 in. cross-section to an elastic modulus of 425,000psi gave a moment of inertia of 54 in.$^4$ for an uncracked section and 42 in.$^4$ for a section with the foam cement of the core or web carrying no tension. The extreme fiber stress for the 33 in. span beam test was 600psi based on the section carrying no tension in the core. The measured midspan deflection of 0.07 inches is within the calculated deflection range of 0.064 in. and 0.081 in. for the uncracked section and the section that carries no tension in the core respectively.

It may be seen from the foregoing description that the herein described method produces an improved foamed masonry polymer impregnated material through a high volume of foam voids in the material which permit readily impregnating the material with a very high vicosity polymerizable liquid which, upon polymerizing within the large volume of foam voids with a high polymer loading in the material produces a lightweight product which is unique in that it combines good insulating properties with high flexural stress capability.

I claim:

1. A method for producing polymer impregnated foamed masonry elements comprising:
 a. blending a preformed foam lather and a mixture of cement, sand and water to produce a paste having foam voids ranging from 50–65 per cent of the paste volume;
 b. casting and curing said paste in a predetermined form;
 c. surrounding one surface of said cured, cast form with a liquid tight enclosure;
 d. removing any latent paste cement film from said one surface and covering said one surface with a layer of an impregnating polymerizable liquid of relatively high viscosity;
 e. covering said polymerizable liquid layer with a water impervious sheet;
 f. covering said water impervious sheet with water to a depth sufficient to cause impregnation to a predetermined depth and in a predetermined time of said one surface by said polymerizable liquid throughout the dispersed void system within a region of said foamed masonry cast form adjacent said one surface;
 g. polymerizing said impregnated liquid in situ;
 h. removing said water, water impervious sheet, remaining polymerizable liquid and said liquid tight enclosure.

2. The method of claim 1 further comprising embedding reinforcing material such as welded wire fabric in said paste during the casting stage.

3. A method for producing a polymer impregnated foamed masonry material as in claim 1 wherein a hollow rubber member is centrally embedded in said paste and extends beyond the ends thereof and is withdrawn prior to setting of said paste forming a bore in the cast form which bore shall create an interface with the pore structure of the cellular concrete to facilitate the use of vacuum means for impregnating the concrete by the polymerizable liquid.

* * * * *